United States Patent [19]

Douglass

[11] Patent Number: 5,480,079
[45] Date of Patent: Jan. 2, 1996

[54] ATTACHABLE CONTAINER PARTICULARLY SUITED FOR AMBULATORY AIDS

[76] Inventor: Karl J. Douglass, 3730 Dogwood La., Doylestown, Pa. 18901

[21] Appl. No.: 125,630

[22] Filed: Sep. 23, 1993

[51] Int. Cl.$^6$ ............................................. B60R 11/00
[52] U.S. Cl. ......................... 224/551; 224/553; 224/400; 224/558; 224/564; 224/567; 135/67; 248/311.2; 220/23.8; 220/555
[58] Field of Search ................... 224/42.43, 42.44, 224/42.45 R, 42.46 R, 273, 42.42, 39, 41, 30 R, 32 R, 400, 545, 547, 550, 551, 553, 558, 564, 567, 571; 220/553, 555, 556, 23.8, 335, 480, 481; 248/230, 311.2; 135/66–68; 280/304.1

[56] References Cited

U.S. PATENT DOCUMENTS

| 11,301 | 1/1893 | Blood | 224/41 |
|---|---|---|---|
| 2,311,049 | 2/1943 | Hedden | 135/68 |
| 2,750,951 | 6/1956 | Barnwell | 135/66 |
| 2,994,366 | 8/1961 | Hoch | 248/230 |
| 3,356,409 | 12/1967 | Belsky et al. | 224/42.42 R |
| 3,603,549 | 9/1971 | Brilando et al. | 248/230 |
| 3,759,569 | 9/1973 | Bennet | 297/194 |
| 3,957,071 | 5/1976 | Kenner | 135/66 |
| 3,985,148 | 10/1976 | Cadman | 135/66 |
| 4,074,683 | 2/1978 | DiChiara | 135/67 |
| 4,146,045 | 3/1979 | Grant | 135/66 |
| 4,184,618 | 1/1980 | Jones | 224/42.46 R |
| 4,289,156 | 9/1981 | Ulics | 135/66 |
| 4,295,483 | 10/1981 | Smith | 135/66 |
| 4,343,400 | 8/1982 | Faucillon | 220/555 X |
| 4,491,257 | 1/1985 | Ingles | 224/42.45 R |
| 4,659,099 | 4/1987 | Malone | 280/304.1 |
| 4,718,555 | 1/1988 | Amberg | 220/555 |
| 4,730,869 | 3/1988 | Schumacher | 297/194 |
| 4,795,182 | 1/1989 | Dyess et al. | 280/304.1 |
| 4,800,911 | 1/1989 | Endres et al. | 135/67 |
| 4,878,685 | 11/1989 | Bahm | 280/304.1 |
| 4,919,443 | 4/1990 | Kehler | 280/304.1 |
| 4,928,865 | 5/1990 | Lorence et al. | 224/42.42 |
| 4,946,058 | 8/1990 | Stamm | 220/23.83 |
| 5,005,661 | 4/1991 | Taylor et al. | 224/41 X |
| 5,054,668 | 10/1991 | Ricchiuti | 224/42.42 |
| 5,101,845 | 4/1992 | Kravetz | 136/66 |
| 5,294,027 | 3/1994 | Plastina | 224/42.45 R |

FOREIGN PATENT DOCUMENTS

| 0492072 | 4/1956 | Italy | 220/555 |
|---|---|---|---|
| 0658128 | 10/1951 | United Kingdom | 224/30 R |
| 0670466 | 4/1952 | United Kingdom | 224/39 |
| 0708207 | 4/1954 | United Kingdom | 224/41 |

*Primary Examiner*—J. Cásimer Jacyna
*Attorney, Agent, or Firm*—Panitch Schwarze Jacobs & Nadel

[57] ABSTRACT

A carrying container that is releasably attached to various ambulatory appliances by a mounting arrangement that has a common interface. The common interface is adapted to snugly mate with several different ambulatory appliances. The carrying container includes several compartments which are dimensioned to receive articles in a snug manner to secure the same during travel.

29 Claims, 5 Drawing Sheets

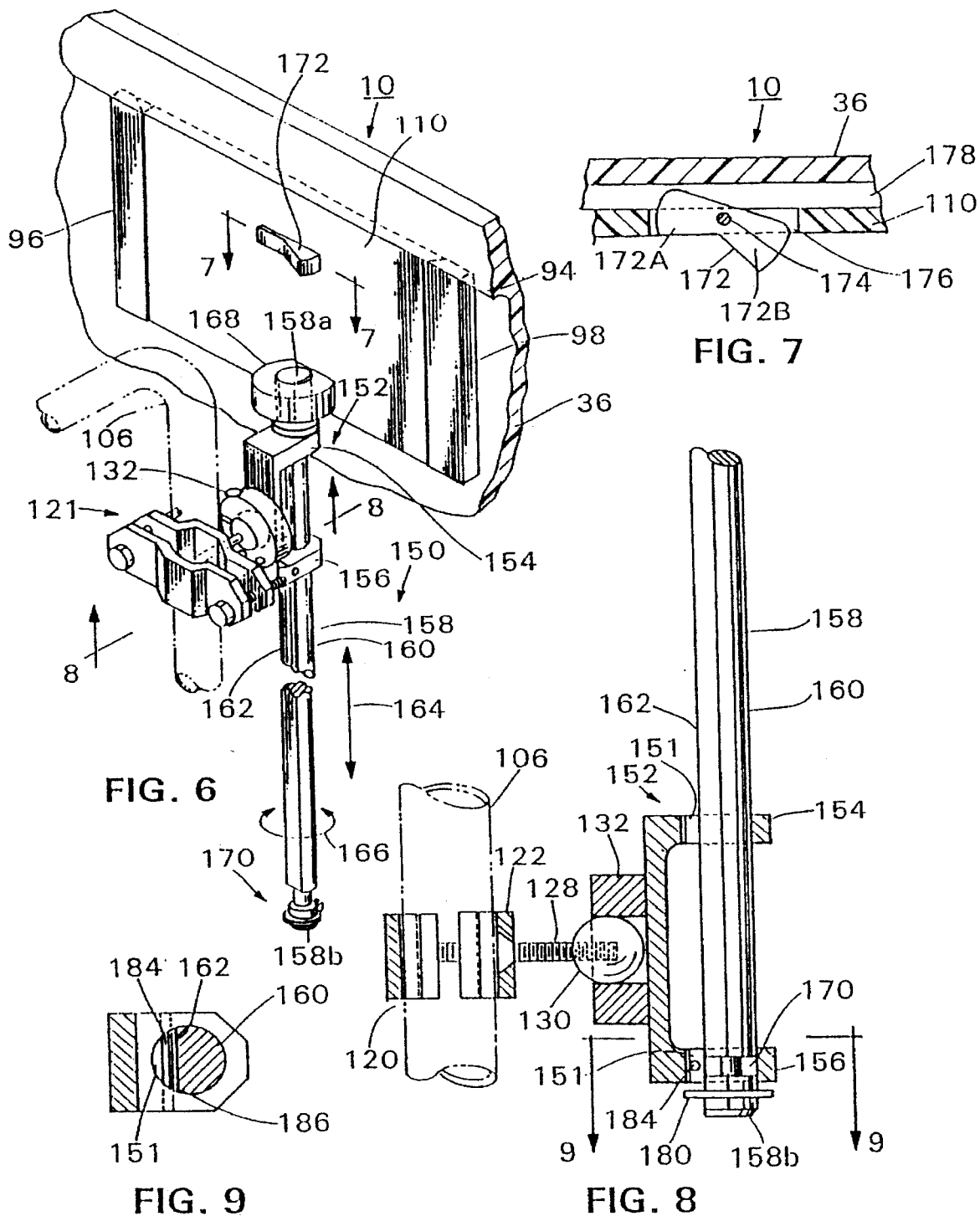

ATTACHABLE CONTAINER PARTICULARLY SUITED FOR AMBULATORY AIDS

FIELD OF THE INVENTION

This invention relates to attachable containers, and more particularly, to attachable containers that are particularly suited for and interchangeable with various ambulatory aids and advantageously have features for holding and making readily accessible articles located within the container.

BACKGROUND OF THE INVENTION

Persons using ambulatory aids, such as wheelchairs, walkers and crutches, desire some means, such as a container, for holding and carrying their necessities while using these aids, for example, holding milk cartons while moving to and from a dinner table. A container that accommodates such holding, which is attachable to ambulatory aids (sometimes called appliances), is disclosed in U.S. Pat. No. 4,491,257 ('257) of Ingles. The container of the '257 patent has a pair of hooks that allow it to be releasably mounted onto the ambulatory aid. The container has no internal partitions to prevent its contents from becoming intermingled and, therefore, difficult to locate. Intermingling may result in damage or scarring of items, such as eyeglasses, that are abrasively rubbed by other relatively hard items located in the container. Furthermore, the container itself may become dislodged from the ambulatory aid because of a sudden, yet inadvertent, contact by the occupant using such an aid.

The prior art indicated by the aforementioned reference seems to suffer from the drawbacks of not providing a container for holding necessities that is free from intermingled contents that may be inadvertently damaged and also lacks provisions that safeguard against the container being dislodged from its ambulatory aid after being subjected to an inadvertent and sudden contact by the occupant.

The present invention overcomes the aforementioned disadvantages by providing a container that is readily and releasably attachable to ambulatory aids without being easily dislodged therefrom and has means to conveniently and safely store articles therein and yet allow for these stored articles to be readily accessed. The present invention also provides a container that is attachable to an ambulatory aid which has compartments therein that are particularly suited for holding different types of necessities, such as medication, pencils, pens, and eyeglasses. The container of the present invention is also readily attachable to different ambulatory aids so that the user may easily transport the container from one ambulatory aid to another as the need may present itself.

SUMMARY OF THE INVENTION

Briefly stated, the present invention comprises an article carrying container adapted for being releasably mounted onto a support apparatus. The article carrying container comprises a bottom wall which includes a first edge, a second edge, a third edge and a fourth edge. A first wall extends generally perpendicularly from the first edge of the bottom wall. A second wall extends generally perpendicularly from the second edge of the bottom wall. A third wall extends generally perpendicularly from the third edge of the bottom wall. The third wall includes a first retainer member positioned on the interior surface of the third wall. A fourth wall extends generally perpendicularly from the fourth edge of the bottom wall. The bottom wall, first wall, second wall, third wall and fourth wall define an interior portion of the container for receiving at least one article therein. The fourth wall includes a mounting member for mounting the container onto the support apparatus. A first compartment is located in the interior portion of the container and receives a first article therein. The first compartment comprises a fifth and a sixth wall with the fifth wall extending generally parallel to the third wall and including a first protrusion member spaced from the first wall and positioned generally opposite from the first retainer member of the third wall of the container. The sixth wall extends between the fifth wall and the fourth wall. A portion of the first wall, a first portion of the third wall and a first portion of the bottom wall of the container define a second compartment therebetween for receiving a second article therein. The first retainer member of the third wall of the container and the first protrusion of the fifth wall cooperate to secure the second article in the second compartment.

In another aspect, the present invention includes an attachment device for releasably mounting a container to an ambulatory appliance having a frame member. The device includes a plate for being connected to the container. A clamp member is clamped around a portion of the frame member. A rod extends from the clamp member and has a generally bulbous-shaped distal end. A gimbal housing is mounted on the plate and includes an opening which frictionally receives the distal end.

In another aspect, the present invention includes an attachment device having a plate for being connected to the container and a clamp member clamped around a portion of the frame member. A rod extends from the clamp member and has a generally bulbous-shaped distal end. A gimbal housing has an opening which frictionally receives the distal end. A platform member is secured to the gimbal housing. The platform member has a flange extending therefrom which includes an opening extending therethrough. A guide tube is slidably disposed within the flange opening and has a first end and a second end. The first end is secured to the plate. The guide tube is movable between a first position wherein the first end of the guide tube is positioned proximate the flange and a second position wherein the second end of the tube is positioned proximate the flange. The guide tube is releasably lockable in the second position.

In another aspect, the present invention is directed to an attachment device releasably mounting a container to a crutch having a pair of spaced side supports and a handle extending therebetween. The handle is fastened to the side supports by at least one fastener. The attachment device comprises a pair of generally elongate members spaced apart from each other by a plate having dimensions selected to accommodate the space between the side supports of the crutch. At least one of the elongate members has an opening aligned to receive the fastener therethrough. Each of the elongate members is secured to the plate.

In another aspect, the invention includes an attachment device for releasably mounting a container to an ambulatory appliance having a frame member. The device includes a plate for being connected to the container and first and second clamp members each for being clamped around a portion of the frame member. A cross member extends between the first and second clamp members and has a longitudinal axis. The first and second clamp members are secured to the cross members such that the first and second clamp members are rotatable with respect to the cross member about an axis which extends generally transverse to the longitudinal axis of the cross member. The plate is secured to the cross member such that the plate is rotatable with respect to the cross member about the longitudinal axis of the cross member.

BRIEF DESCRIPTION OF THE DRAWINGS

The foregoing summary, as well as the following detailed description of preferred embodiments of the invention, will be better understood when read in conjunction with the appended drawings, where like numerals indicate like elements throughout the several views. For the purpose of illustrating the invention, there is shown in the drawings embodiments which are presently preferred. It should be understood, however, that the invention is not limited to the precise arrangements and instrumentalities shown. In the drawings:

FIG. 6 is a partial perspective view of a second adapter for connecting the container to a wheelchair;

FIG. 7 is a cross-sectional view, taken along lines 7—7 of FIG. 6, showing details of a push button for locking the adapter to the container;

FIG. 8 is a cross-sectional view, taken along lines 8—8 of FIG. 6, showing further details of the adapter of FIG. 6;

FIG. 9 is a cross-sectional view, taken along lines 9—9 of FIG. 8, showing further details of the adapter of FIG.

DETAILED DESCRIPTION OF THE PREFERRED EMBODIMENTS

Figure 1:
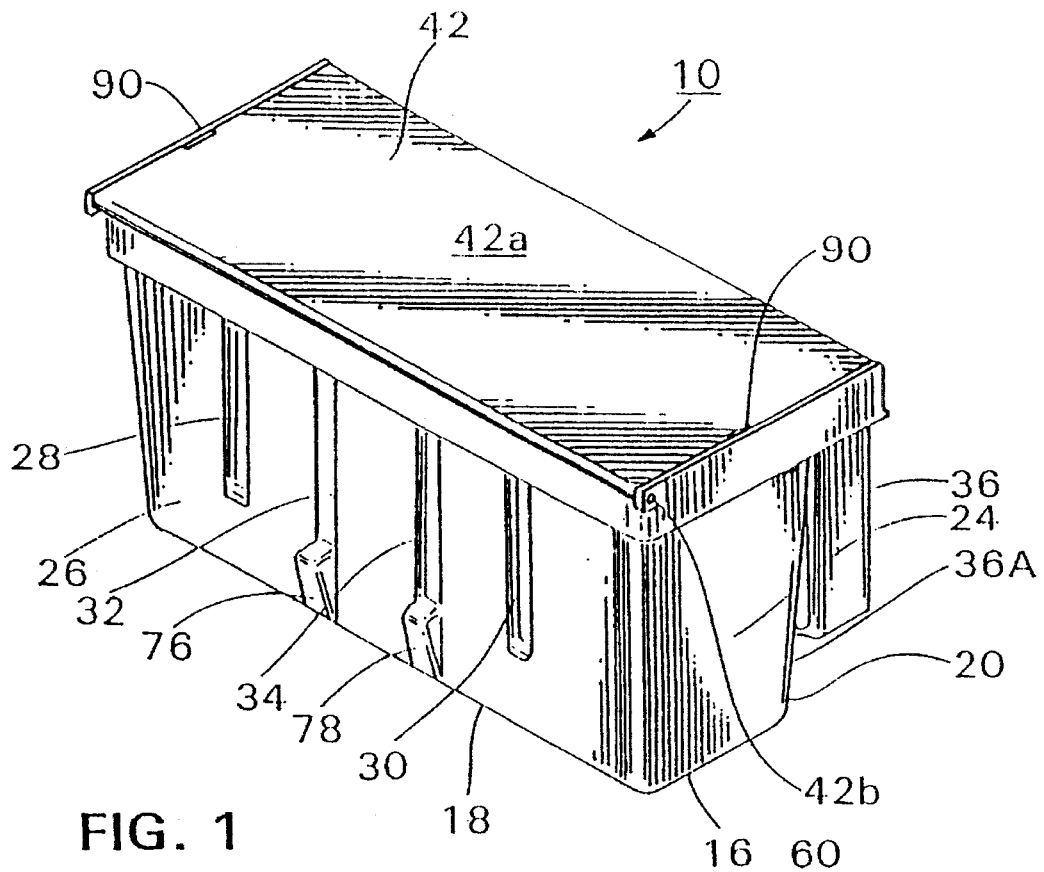
FIG. 1 is a perspective view of a container in accordance with the present invention.

In the drawings, like numerals are employed for the indication of like elements throughout.

Figure 2:
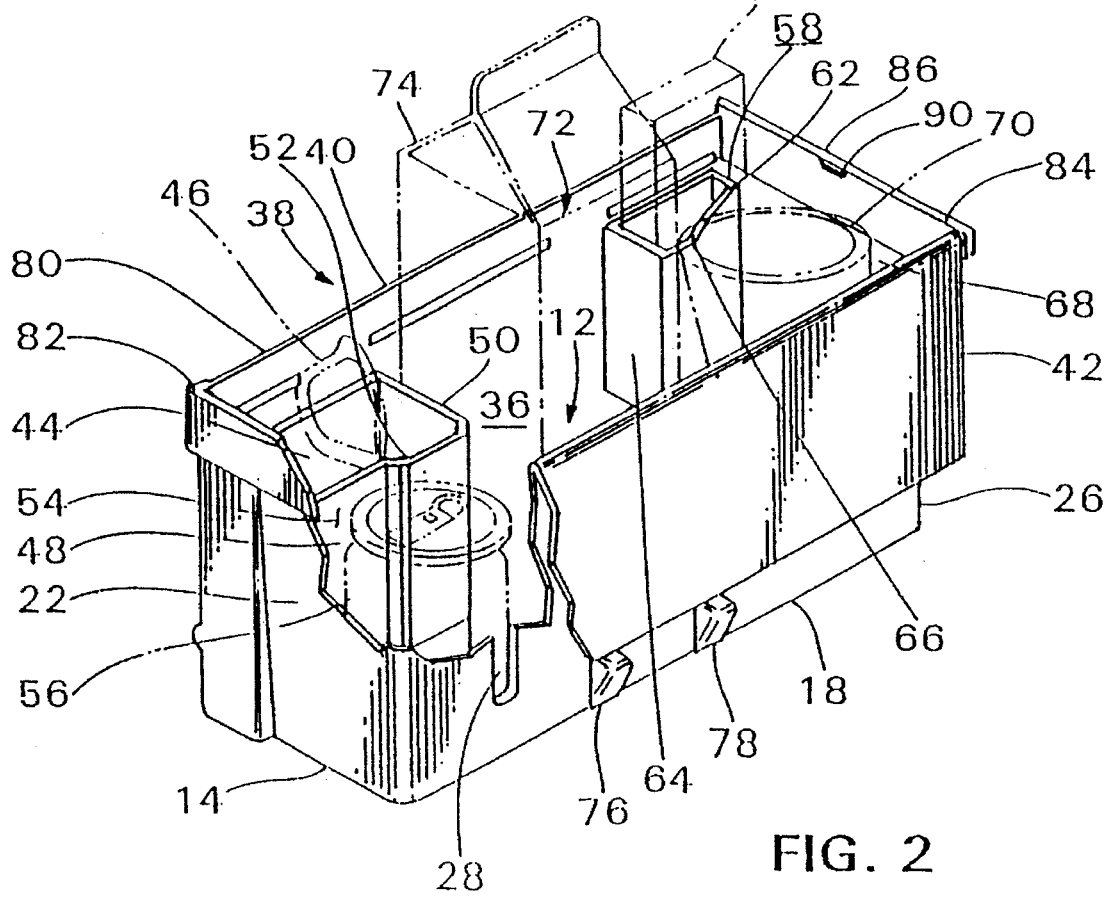
FIG. 2 is a perspective view of the container of FIG. 1 with its lid in the open position and partially broken away to show some of the details of its interior.

Referring to both of the perspective views of FIGS. 1 and 2, there is illustrated an article carrying container 10 in accordance with the present invention. The container 10 is generally rigid and is releasably attachable to ambulatory appliances, such as walkers, wheelchairs, motorized scooters, motorized wheelchairs, or even crutches. The container 10 is compartmentalized to accommodate large items like conventional half-gallon containers of milk, reading matter, dinner dishes and also has dedicated space available to safely store necessities, such as eye glasses, utensils, or medications, as described in more detail hereinafter.

Again, with simultaneous reference to both FIG. 1 showing the closed condition of the article carrying container 10 and FIG. 2 partially cut away for a more clear showing of the interior of the container 10, the container 10 has a bottom wall generally indicated by reference number 12 having a first edge 14, a second edge 16, a third edge 18, and a fourth edge 20. A first wall 22 extends from the first edge 14 and a second wall 24 extends from the second edge 16. Both the first and second walls 22, 24 extend generally perpendicular to the bottom wall 12. A third wall 26 extends generally perpendicularly from the third edge 18.

As best seen in FIG. 1, the third wall 26 comprises a first rib 28, a second rib 30, a third rib 32 and a fourth rib 34 which are preferably integrally formed as part of the container 10, but could be separate elements which are attached to the third wall 26 by standard fastening methods. The terms "rib" and "retainer member" are used herein in an interchangeable manner and each such element structurally increases the rigidity of the component in which it is formed. Each of the ribs 28, 30, 32 and 34 have a length that extends generally perpendicular with respect to the bottom wall 12.

A fourth wall 36 extends generally perpendicularly from the fourth edge 20 of the bottom wall 12. As can be partially seen in FIG. 1, the fourth wall 36 has a stepped portion 36A. The bottom wall 12, the first wall 22, the second wall 24, the third wall 26 and the fourth wall 36 define an interior portion generally indicated by reference number 38 (see FIG. 2) of the container 10 for receiving at least one article therein. The fourth wall 36 includes a mounting member or portion 40 (not shown in FIGS. 1 and 2, but to be described with reference to FIG. 3). As will be further discussed hereinafter, the mounting member 40 provides the means for easily, reliably and releasably mounting the container 10 to a support apparatus, such as a wheelchair, a walker, a crutch, a bed post or a motorized vehicle.

As best seen in FIG. 1, the container 10 includes a lid 42 which is generally parallel to and spaced from the bottom wall 12 when the lid 42 is in the closed position. The lid 42 is movable between an open position for permitting access to the interior portion 38 of the container 10 and a closed position for inhibiting access to the interior portion 38 of the container 10, as described in more detail hereinafter. The lid 42 has a generally flat, smooth working surface 42a which can be used to perform various tasks including having writing performed thereon.

In the present embodiment, it is preferred that the container 10 be constructed of polyethylene and be formed by a blow molding process. However, it is understood by those skilled in the art that other materials could be used, such as acrylic plastic, plasticized corrugated cardboard, or polymeric material, and other manufacturing processes could be used, such as injection molding or vacuum molding, without departing from the spirit and scope of the invention. Any of the materials selected are preferably shatterproof when dropped in the presence of relatively cold temperatures, easily cleanable, and are rugged enough to be washed in an appropriate dishwasher.

In the present embodiment, it is preferred that the container 10 be shaped in the form of a parallelepiped. However, it is understood by those skilled in the art that the particular shape of the container 10 is not pertinent to the present invention and that other configurations, such as cylindrical, could be used without departing from the spirit and scope of the invention.

The container 10 has a first compartment 44 located in the interior 38 and receives a first article 46 which may comprise a pair of eye glasses (shown in phantom), or any other necessity that is desired to be in the immediate reach of an individual using an ambulatory aid. The first compartment 44 includes a fifth wall 48 and a sixth wall 50 with the fifth wall 48 extending generally parallel to the third wall 26 and including an outwardly bowed first protrusion 52 spaced apart from the first wall 22. The first protrusion 52 comprises a rib that extends generally perpendicular with respect to the bottom wall 12. The sixth wall 50 extends between the fifth wall 48 and the fourth wall 36. A portion of the fifth wall 48, a portion of the first wall 22, a first portion of the third wall 26 and a first portion of the bottom wall 12, define a second compartment 54 for receiving an article 56 therein. The first retainer member 28 of the third wall 26 and the protrusion 52 of the fifth wall 50 cooperate to secure the article 56 in the second compartment 54. The dimensions of the first retainer member 28 and the first protrusion 52, as well as the second compartment 54, are preferably selected so that an article 56, such as a twelve-ounce beverage can (shown in phantom), snaps into position therebetween and is captured between the first retainer member 28, first wall 22 and the first protrusion 52 to be held in the second compartment 54.

A third compartment 58 is located in the interior portion 38 of the container 10 and provides for a space for receiving a third article 60 which may be a pack of playing cards (shown in phantom). The third compartment 58 comprises a seventh wall 62 and an eighth wall 64 with the seventh wall 62 extending generally parallel to the third wall 26 of the container 10. The third compartment 58 includes an outwardly bowed second protrusion 66 positioned generally opposite the second rib 30 of the third wall 26. The second protrusion 66 comprises a rib that extends generally perpendicular with respect to the bottom wall 12. The eighth wall 64 extends between the seventh wall 62 and the fourth wall 36. The seventh wall 62, a portion of the second wall 24, a second portion of the third wall 26 and a second portion of the bottom wall 12 define a fourth compartment 68 therebetween for receiving a fourth article 70 therein which may be a reusable container (shown in phantom). The second rib 30 of the third wall 26, and the second protrusion 66 of the seventh wall 62 cooperate with each other to secure the fourth article 70 in the fourth compartment 68. The dimensions of the second rib 30 and the protrusion 66, as well as the shape of the fourth compartment 68, are preferably selected so that the article 70 snaps into position therebetween and is captured between the second wall 24, second protrusion 66 and second rib 30 to be held in the fourth compartment 68.

A fifth compartment, generally indicated by reference number 72, is located in the interior 38 of the container 10 and provides a relatively large space for receiving a relatively large fifth article 74, such as a half-gallon container of milk (shown in phantom). The fifth compartment 72 is defined by the sixth wall 50, the eighth wall 64, a third portion of the third wall 26, a second portion of the fourth wall 36 and a third portion of the bottom wall 12. Depending upon the size and shape of the fifth article 74, the third and fourth ribs 32 and 34, respectively, of the third wall 26, the sixth and eighth walls 50 and 64, respectively, and a portion of the fourth wall 36 cooperate to secure the article 74 within the fifth compartment 72, or a portion of the third wall 26, the sixth and eighth walls 50 and 64, respectively, and a portion of the fourth wall 36 cooperate to secure the article 74 within the fifth compartment 72.

As shown in FIGS. 1 and 2, the first wall 22, second wall 24, third wall 26, fourth wall 36 are positioned relative to the bottom wall 12 to form an obtuse angle of less than about 100° relative thereto. This slight angle results in the walls acting as cams to guide and lock the articles into their respective compartments, as described above.

While the foregoing description refers to five separate compartments within the interior portion 38, it is understood by those skilled in the art that the present invention is not limited to any particular number of compartments within the container 10 or any particular orientation of the compartments, since the compartments can be arranged or configured in a number of different manners without departing from the spirit and scope of the invention. For instance, the interior portion 38 could be divided into anywhere from one to ten compartments, each being of varying size to accommodate different standard sized commercially available containers, such as soda cans, juice boxes, milk cartons, snack boxes, candy bars, etc.

Referring now to FIGS. 1 and 2, the lid 42 is pivotally mounted to the first and second walls 22, 24 by two standard hinge pins 42b (only one is shown) to permit the lid 42 to move between the open (FIG. 2) and closed (FIG. 1) positions. The third wall 26 has wedge shaped extensions 76 and 78 on its external surface that serve as lid retainer members that frictionally engage with and hold the lid 42, when the lid 42 is in its fully-opened position. The fourth wall 36, first wall 22, and second wall 24 each include an upper edge 80, 82, and 84, respectively. The upper edges 82, 84 of the first and second walls 22, 24 are positioned above the upper edge 80 of the third wall 26 a distance which is generally equal to the thickness of the lid 42. Thus, the working surface 42a and the upper edges 82, 84 of the first and second walls are generally coplanar when the lid 42 is in the closed position. The lid 42 is dimensioned so that it extends over the upper edge 80 to allow grasping thereof in the closed position. The first and second walls 22, 24 each include an inwardly extending projection 90 proximate the upper edges 82, 84 for frictionally holding the lid 42 in the closed position.

Figure 3:
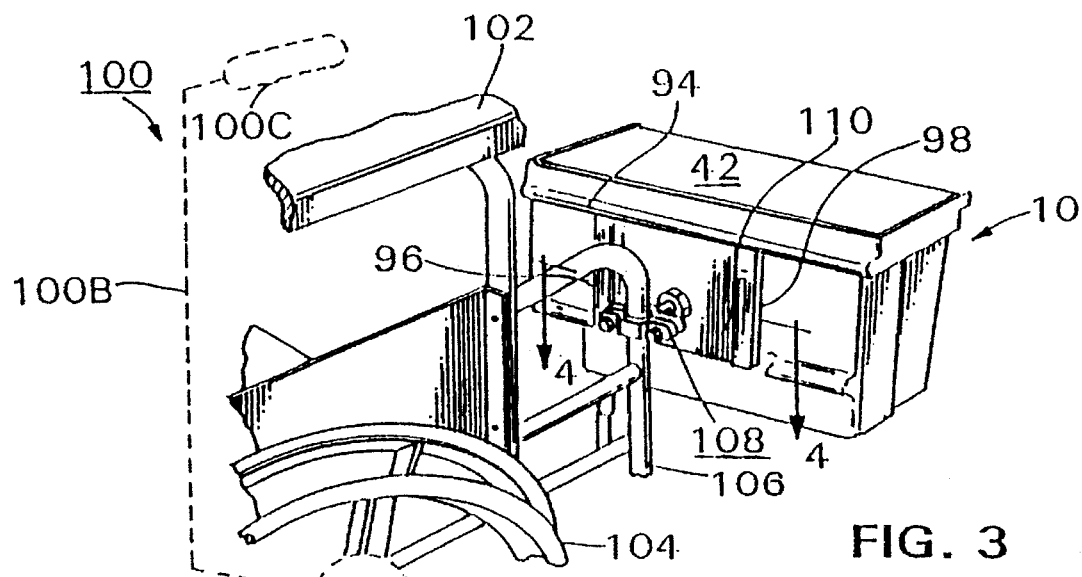
FIG. 3 is a partial perspective view of a wheelchair having the container attached thereto.
Figure 4:
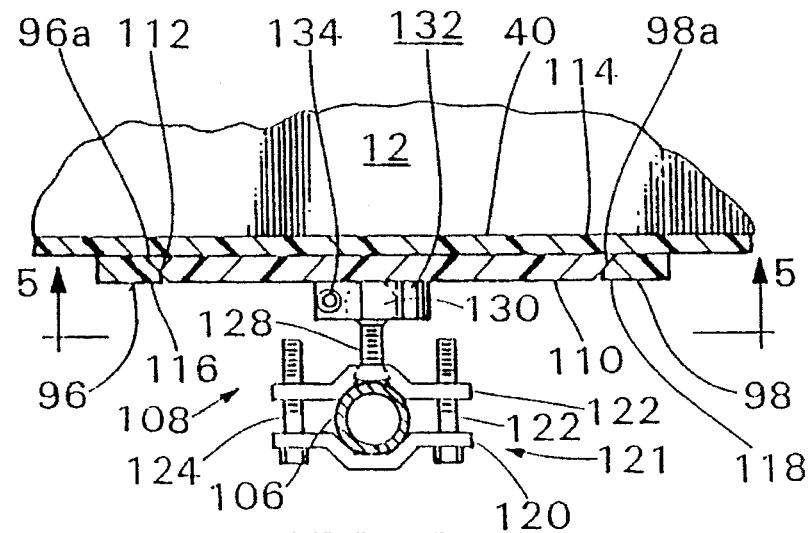
FIG. 4 is a cross-sectional view, taken along the lines 4—4 of FIG. 3, showing details of a first adapter for connecting the container to the wheelchair.

Referring now to FIGS. 3 and 4, the fourth wall 36 of the container 10 includes the mounting member 40 for mounting the container 10 upon a support apparatus such as a wheelchair 100. In the present embodiment the mounting member 40 comprises a pair of spaced apart ribs 96, 98 for increasing the rigidity of the fourth wall 36. Each of the ribs 96, 98 includes a beveled edge which forms a slot 96a, 98a, respectively, for receiving a plate 110 of an adapter 108 for mounting the container 10 upon the support apparatus or wheelchair 100, as described in more detail below. The ribs 96, 98 are preferably formed from the same material as the container 10 and are secured to the fourth wall 36 by conventional fastening methods, such as adhesive or hardware fasteners. However, it is understood by those skilled in the art that the ribs 96, 98 could be formed integrally with the fourth wall 36 during the molding process or be constructed of different materials from the containers, without departing from the spirit and scope of the invention.

As shown in FIG. 3, the wheelchair 100 has an arm rest 102, a grippable wheel 104, and a frame member 106. The wheelchair 100 is of the standard type well understood by those skilled in the art, therefore further description thereof is omitted for purposes of convenience only and is not limiting. The frame member 106 can be any portion of the frame of the wheelchair 100 as desired by the user. However, it is understood that the wheelchair 100 may be motorized (schematically shown in phantom) and include a hub 100A that is rotatable in response to drive power and a drive transmission device 100B that is responsive to a control handle 100C.

The plate 110 has beveled lateral edges 112 and 114 that are complementary to and respectively mate with the beveled edges 96a, 98a of ribs 96 and 98, respectively, so that the plate 110 snugly, yet releasably, fits against the fourth wall 36 of the container 10. That is, the plate 110 is slidably disposed between the ribs 96, 98 to allow the plate 110 and adapter 108 to be easily removed from the container 10. A horizontal rib 94 extends across the fourth wall 36 above the horizontal ribs 96, 98 to engage the upper edge of the plate 110 and prevent the plate 110 from sliding further toward the lid 42.

While it is preferred that the plate 110 and ribs 96, 98 employ a dovetail connection to lock the plate 110 to the container 10, it is understood by those skilled in the art that other interfaces could be used to connect the adapter 108 to the container 10. For instance, the adapter 108 could include a detent mechanism (not shown) which fits within a complementarily sized socket (not shown) in the container 10 or the ribs 96, 98 and plate 110 could have a sliding stepped interlock connection (not shown), without departing from the spirit and scope of the invention.

As best shown in FIG. 4, the adapter 108 further includes a clamp member 121 clamped around a portion of the frame member 106. In the present embodiment, the clamp member 121 includes a first generally V-shaped clamp 120, a second generally V-shaped clamp 122, and a pair of bolts 124 and 126 extending therebetween to secure the first and second clamps 120, 122 about the frame member 106. Each of the first and second clamps 120, 122 is inclined to self-center the clamp member 121 on the frame member 106 and to accommodate frame members having varying diameters. If desired, the clamps 120 and 122 may be formed into one integral clamp. A rod in the form of a threaded member 128 extends from an opening in the second V-shaped clamp 122 and includes a generally bulbous-shaped distal end 130. The distal end 130 is preferably threaded onto the member 128, but if desired, the distal end 130 and member 128 may be one integral piece.

The generally bulbous-shaped distal end 130 is movable within a gimbal housing 132 which is attached to the plate 110. The gimbal housing 132 has an opening frictionally receiving the distal end 130 and utilizes a screw adjustment mechanism 134 which adjusts a size of the opening by squeezing the opening to adjust the ease of freedom that the distal end 130 can be moved with respect to the gimbal housing 132.

Figure 5:
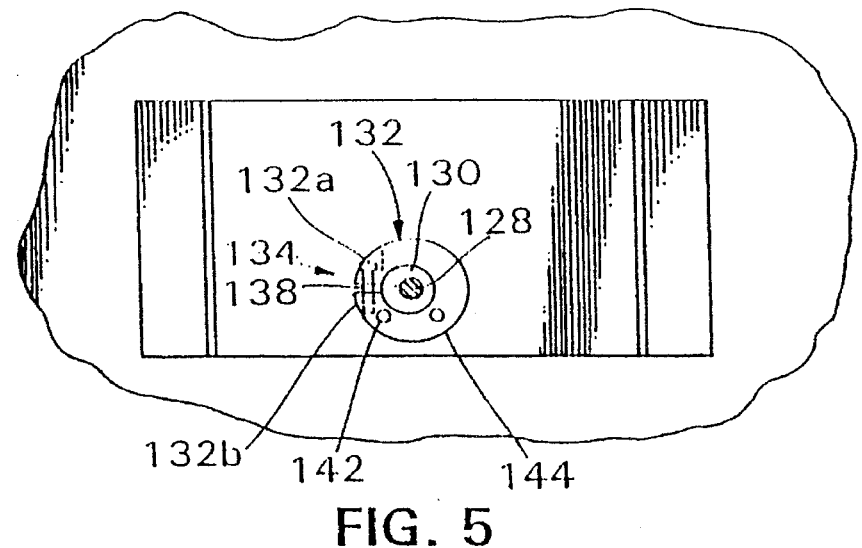
FIG. 5 is a cross-sectional view, taken along lines 5—5 of FIG. 4, showing further details of the first adapter of FIG. 4.

Referring now to FIG. 5, the gimbal housing 132 is generally C shaped in plan view. The screw adjustment mechanism 134 includes a screw 138 extending between the ends 132a, 132b of the gimbal housing 132. By turning the screw 138 the size of the opening which receives the distal end 130 is adjusted to ease the freedom that the distal end 130 can move with respect to the gimbal housing 132. The gimbal housing 132 is connected to the plate 110 by means of standard fasteners, such as screws 142 and 144. If desired, bushings (not shown) can be placed within the opening of the gimbal housing 132 which can compress the distal end 130. The adapter 108, shown most clearly in FIG. 3, having the gimbal housing 132 allows the container 10 to be universally swiveled in any direction so that the contents of the container 10 may be made more readily accessible to the occupant of the wheelchair 100. In use, once the container 10 is located in the preferred position, the screw 138 is turned until the gimbal housing 132 securely holds the container 10 in the preferred position.

Referring now to FIGS. 6 through 9, there is shown a second adapter 150 for connecting the container 10 to a support apparatus, such as the wheelchair 100. The second adapter 150 allows the container 10 to be swung up and inward over the occupant's lap to allow the occupant to more easily access the contents of the container 10 and the wheelchair 100 to more readily slip through tight passageways. The second adapter 150 includes the clamp member 121 and gimbal housing 132, discussed with reference to FIGS. 4 and 5. The gimbal housing 132 is attached to a platform member 152 which includes at least one, but preferably two, upper and lower, flanges 154, 156 each with an opening 151 therethrough. One of the flanges 154, 156, preferably the lower flange 156, has a catch 184 that extends into the opening 151 a predetermined distance.

The second adapter 150 further comprises a guide tube 158 which is inserted into the opening 151 of both the upper and lower flanges 154, 156 and which preferably has a rounded portion 160 and a flat portion 162 both of which portions longitudinally extend the majority of the length of the guide tube 158. The guide tube 158 is slidably disposed within the opening of the flanges 154 and 156 and is movable in an upward or downward direction, as shown by bilateral arrow 164, and is rotatable (as to be described) in a clockwise or counterclockwise direction as shown by arrow 166.

The guide tube 158 has a first end 158a and a second end 158b with the first end 158a being secured to the plate 110 by a clamp member 168. The clamp member 168 is similar to the gimbal housing 132 in that it secured to the plate 110 by standard screws (not shown) and includes an adjustment mechanism (not shown) for tightly receiving the first end 158a of the guide tube 158. The guide tube 158 is movable between a first position wherein the first end 158a is positioned proximate the upper flange 154 and a second position wherein the second end 158b of the guide tube 158, having a keyway 170, is positioned proximate the lower flange 156. As seen in FIG. 8, the second end 158b of the guide tube 158 includes a limiting stop member 180 in the form of a snap ring. The limiting stop member 180 establishes the extreme end of the longitudinal movement of the second end 158b of the guide tube 158 in the openings of the flanges 154 and 156 (i.e., the second position). That is, the guide tube 158 is moved upward to the second position so that its limiting stop 180 is positioned under the flange 156.

As shown in FIG. 8, the keyway 170 is positioned within the opening 151 of the flange 156 when the guide tube 158 is in the second position. The keyway 170 is in the form of a cut-out or groove which is proximate the catch 184. The catch 184 is in the form of a pin secured within the opening 151 of the flange 156. The guide tube 158 is rotatable with respect to the platform 152 when in the second position between a locked position wherein the catch 184 is positioned within the keyway 170 to longitudinally lock the guide tube 158 in the second position and an unlocked position wherein the catch 170 is spaced from the keyway 170 to allow the guide tube 158 to longitudinally move between the first and second positions.

Referring now to FIGS. 8 and 9, the flat portion 162 of the guide tube 158 is shown facing the catch 184 (i.e., the unlocked position). The flat portion 162 of guide tube 158 is dimensioned to not contact the catch 184 as the guide tube 158 is longitudinally moved between the first and second positions. To move the guide tube 158 to the second and locked positions, it is rotated 180 degrees until the round portion 160 faces the keyway 170. In this orientation, the catch 184 is positioned within the keyway 170 to longitudinally lock the guide tube 158 in its second or up position.

More particularly, the rounded portion 160 has a generally semicircular shape, whereas the flat portion 162 is truncated or generally linear in cross section. As further seen in FIG. 9, the flat or truncated portion 162 is separated from the catch 184 by a predetermined distance 186. The catch 184 is spaced from the keyway 170 so that the guide tube 158 may be longitudinally moved between its first and second positions. As the guide tube 158, in particular the keyway 170, is rotated, the rounded portion 160 will rotate over and come into contact with the catch 184 so that the guide tube 158 may not be moved in either an upward or a downward direction. Conversely, to allow for upward and downward movement, the guide tube 158, in particular the keyway 170, need only be rotated so that the flat portion 162 faces the catch 184 freeing the guide tube 158 from coming into contact with the catch 184 and, accordingly, allowing for freedom of upward and downward movement of the guide tube 158.

As may be best appreciated from FIG. 6, the guide tube 158 may be moved upward and downward, and because of the gimbal housing 132, may also be swiveled in any direction to correspondingly allow the container 10 to be swiveled or translated in any direction, relative to the frame member 106, to cooperate with the upward/downward movement of the guide tube 158, thereby, easing the movement of the wheelchair 100 in and out of tight spaces, or to more conveniently place the contents of the container 10 within the reach of the occupant of the wheelchair 100.

Referring now to FIG. 7, the plate 110 is lockable to the container 10 by the operation of a push button 172. The push button 172 has wings 172A and 172B and is pivoted about a pin 174 fixed in the plate 110. The wings 172A and 172B are rocked within an opening 176 of plate 110 which leads into a channel or rib 178 located in the fourth wall 36 of the container 10. In operation, when the push button 172 is rocked so that either wing 172A or 172B is positioned in and engages channel 178, then the plate 110 is locked to the container 10 (i.e., the locked position) between the rib 78 and the horizontal rib 94. Conversely, when the push button 172 is positioned so that neither wing 172A nor 172B finds its way into the channel 178, then the plate 110 of the second adapter 150 can be disengaged from the container 10 (i.e., the release position).

It is understood by those skilled in the art that a detent mechanism (not shown) can be positioned between the button 172 and the plate 110 for locking the position of the button 172 in either the locked or release positions. Further, while the button 172 is described only in connection with the second adapter 150, it is understood by those skilled in the art that the button 172 is equally usable on all of the adapters described herein.

Figure 10:
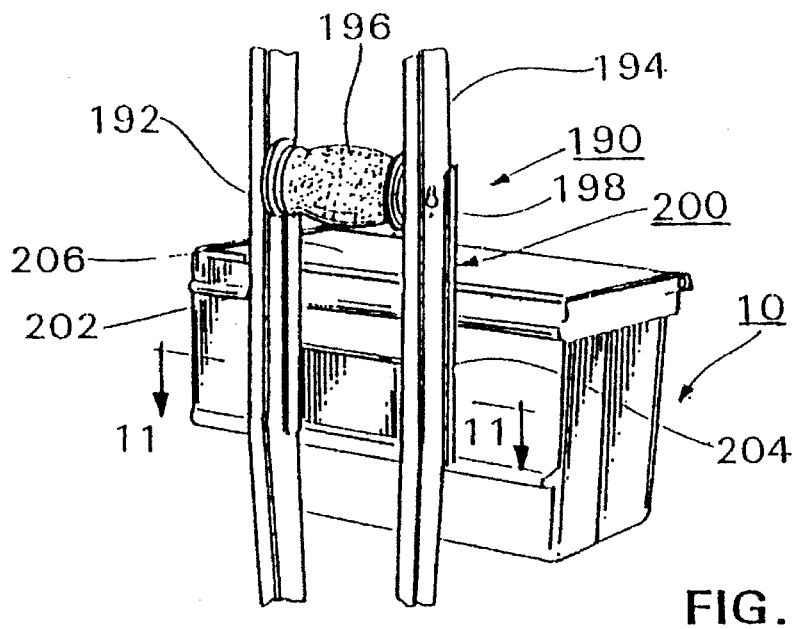
FIG. 10 is a partial perspective view showing the container of the present invention attached to a crutch.

Referring now to FIGS. 9 and 10, there is shown a third adapter 200 for mounting the container 10 to a standard wooden or metallic crutch 190. The crutch 190 has a pair of spaced apart supports 192 and 194 having a handle 196 therebetween at right angles thereto. The handle 196 has an elongated fastener 198, such as a screw, passing therethrough for attaching the handle 196 to the supports 192 and 194. A tip holder 208 extends between the lower ends of the supports 192, 194.

Figure 11:
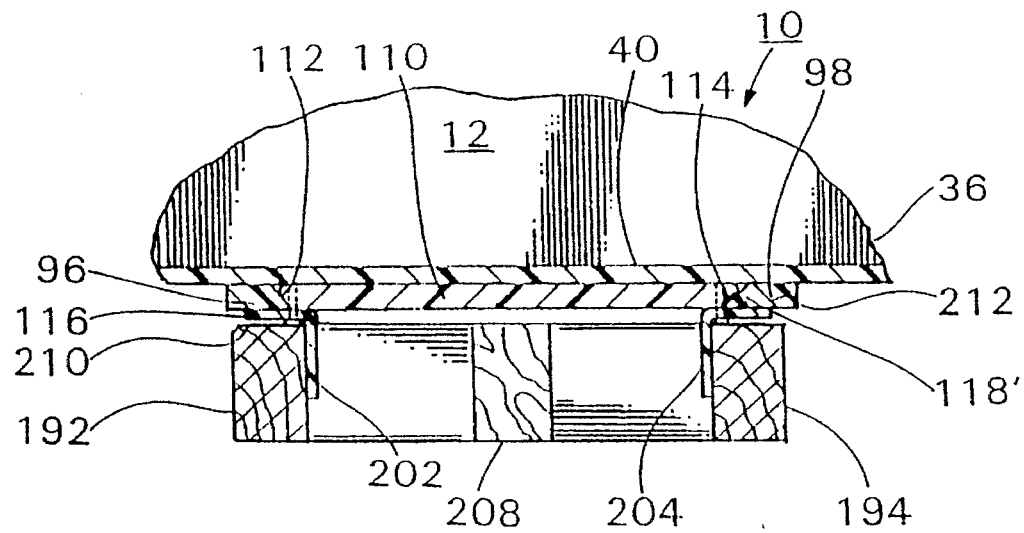
FIG. 11 is a cross-sectional view, taken along lines 11—11 of FIG. 10, showing a third adapter for mounting the container to the crutch.

The third adapter 200 includes a pair of elongate spaced members 202 and 204 which are generally L-shaped in cross section to correspond to the shape of the support members 192, 194. As seen in FIG. 11, the third adapter 200 comprises a plate 110 which is generally identical to the plate 110 previously discussed with reference to FIG. 4.

The elongated fastening member 198 preferably attaches the elongate members 202, 204 to the supports 192, 194 by extending through a suitably sized aperture (not shown) in the upper ends of the elongate supports 202, 204. It is understood by those skilled in the art that other means may be provided for attaching the elongate members 202, 204 to the crutch 190, such as an adhesive or other standard fasteners. The elongate members 202 and 204 are respectively connected to the plate 110 by means of a plurality of screws 210 and 212. The attachment of the plate 110 to the container 10 is generally identical to that described above in connection with the first and second adapters 108, 150.

Referring now to FIGS. 12 through 15, there is shown a fourth adapter 221 for attaching the container 10 to a walker 220. The fourth adapter 221 provides the container 10 with six degrees of freedom with respect to the walker 220 to facilitate the attachment of the container 10 to the walker 220. The walker 220 comprises two U-shaped members 222 and 224 that are spaced apart from each other to provide a space 226 in which the occupant or user positions himself or herself. Each of the U-shaped members 222 and 224, having grip handles 222A and 224A respectively, further comprises a support cross member 228. Generally horizontal first and second frame members 232, 234 extend between the two U-shaped members 222, 224 to provide the walker 220 with structural integrity.

The container 10 is attached to the first frame member 232, in part, by first and second clamp members 236, 238. The first and second clamp members 236, 238 are generally identical to the clamp member 121 described above in connection with first adapter 108. Accordingly, further description thereof is omitted for purposes of convenience only and is not limiting. A cross member 246 extends between the first and second clamp members 236, 238 and includes a longitudinal axis 245. The first and second clamp members 236, 238 are secured to the cross member 246 such that the first and second clamp members 236, 238 are rotatable with respect to the cross member 246 about an axis 247 which extends generally transverse to the longitudinal axis 245 of the cross member 246. The plate 110 is secured to the cross member 246 such that the plate 110 is rotatable with respect to the cross member 246 about the longitudinal axis 245 of the cross member 246. Further, the cross member 246 is longitudinally expandable to adjust a distance between the first and second clamp members 236, 238. The first and second clamp members 236, 238 are secured to the cross member 246 such that the first and second clamp members 236, 238 are rotatable with respect to the cross member 246 about the longitudinal axis of the cross member 246 to allow the plate 110 to rotate with respect thereto.

Third and fourth clamp members 240 and 242 are rotatably secured to first and second clamp members 236, 238, respectively, to provide first and second sets of dual clamp members 244a, 244b. The first set of dual clamp members 244a formed by first and third clamp members 236 and 240 is described with reference to FIG. 13 with the understanding that the description to be given is equally applicable to the second set of dual clamp members 244b formed by second and fourth clamp members 238 and 242.

Figure 13:
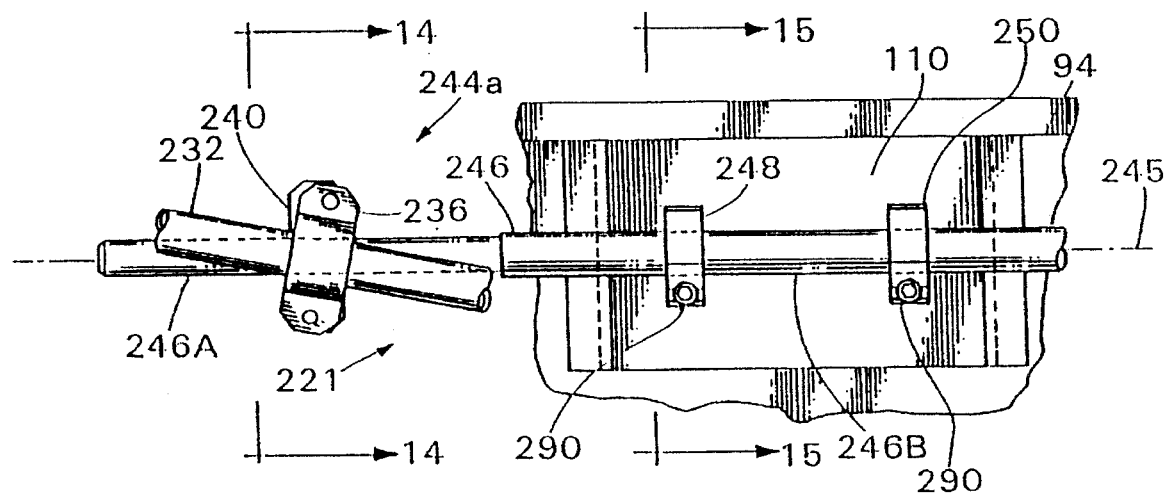
FIG. 13 is a greatly enlarged partial elevational view of a fourth adapter for connecting the container to the walker of FIG. 12.

FIG. 13 generally shows a first set of dual clamp members 244a as comprising the first and third clamp members 236 and 240. The first clamp member 236 is clamped around the first frame member 232 of the walker 220 and the third clamp member 240 is clamped around a portion 246A of cross member 246. The cross member 246 runs along, in a transverse manner, the majority of the fourth wall 36 of the container 10 and is attached to the plate 110 by means of fifth and sixth clamp members 248, 250 each of which is fastened to the plate 110 by a screw 282 (see FIG. 15), as described below.

Referring now to FIG. 13, the cross member 246 includes first and second telescopic portions 246A and 246B that are expandable and contractible so that the length of the cross member 246 may be adjusted to accommodate its mounting onto the walker 220 (i.e., the first degree of freedom). The first portion 246A is rotatable with respect to second portion 246B (i.e., the second degree of freedom) to assist, in part, in the mounting of the fourth adapter 221 to the walker 220. Once the fourth adapter 221 is attached to the walker 220 the first portion 246A becomes rotatably and translationally fixed to the second portion 246B, as will become apparent from the description hereinafter.

Figures 14, 15:
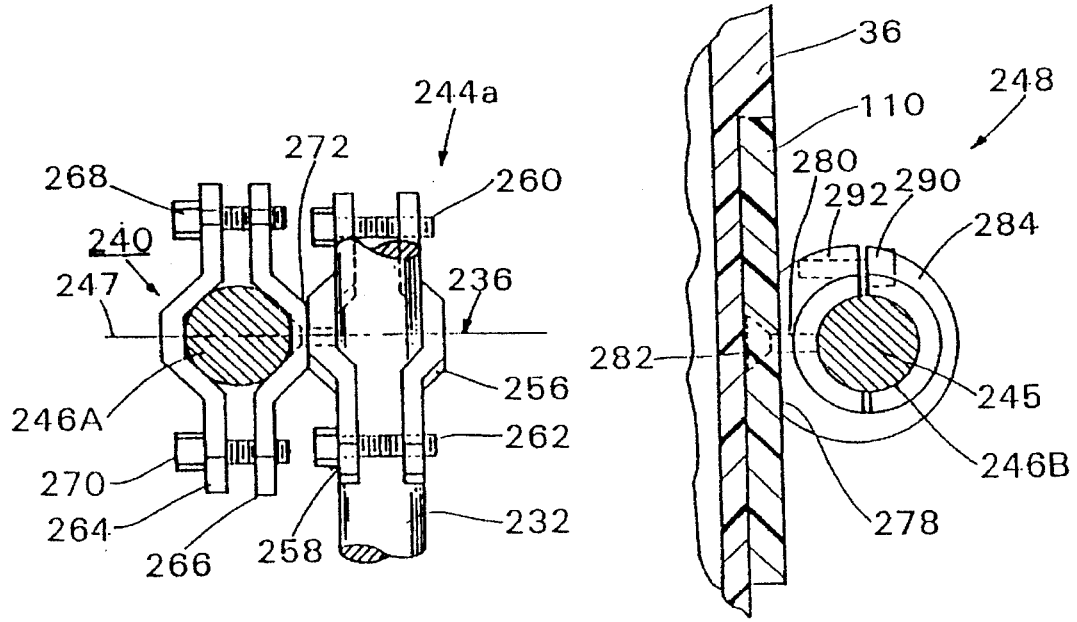
FIG. 14 is a cross-sectional view, taken along lines 14—14 of FIG. 13, showing further details of the fourth adapter.
FIG. 15 is a cross-sectional view, taken along lines 15—15 of FIG. 13, showing further details of the fourth adapter.

Referring now to FIG. 14, there is shown the first set of dual clamp members 244a which includes the first clamp member 236 comprising a pair of V-shaped members 256 and 258 which are brought together by threaded bolts 260 and 262 to be clamped around the cross member 232. Similarly, the second set of dual clamp members 244a includes the third clamp member 240 comprising of a pair of V-shaped clamp members 264 and 266 which are brought together by threaded bolts 268 and 270 to be clamped around the first portion 246A of cross member 246. The first and third clamp members 236, 240 are rotatably secured together by a fastener 272 to form the first set of dual clamp members 244a. In the present embodiment, the fastener 272 is preferably a screw extending through an oversized aperture in the V-shaped clamp member 266 and being threadably attached to the V-shaped clamp member 258. By loosening the threaded bolts 268 and 270, the third clamp member 240 can be moved longitudinally along the first portion 246A (i.e., the third degree of freedom). Similarly, by loosening the fastener 272, the third clamp member 240 can be rotated with respect to the first clamp member 236 (i.e., the fourth degree of freedom).

The following description of the fifth clamp member 248 shown in FIG. 15 is equally applicable to sixth clamp member 250, shown in FIG. 13. The fifth clamp member 248 has a flat face 278 having a threaded aperture 280 which accommodates the insertion of the screw 282 (shown in phantom) so that fifth clamp member 248 may be flush mounted onto the plate 110. The fifth clamp member 248 is similar to the gimbal housing 132 previously described with reference to FIGS. 4 and 5 and includes a generally C-shaped housing 284 which includes an opening for receiving the second portion 246B therethrough. The fifth clamp member 248 may be rotated or translated with respect to the second portion 246B about or along the axis 245 of the cross member 246 by merely loosening the screw 290 and rotating or translating the fifth clamp member 248 (i.e., the fifth and sixth degrees of freedom). The rotation of the fifth clamp member 248 relative to the cross member 246 correspondingly causes rotation of the container 10 relative to the cross member 246.

Figure 12:
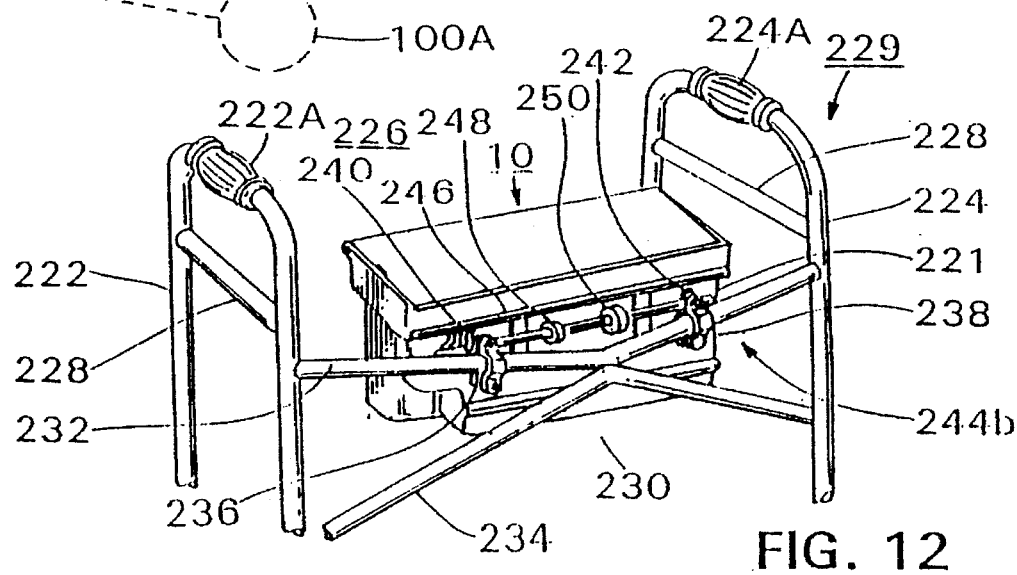
FIG. 12 is a perspective view of a walker having the container of the present invention attached thereto.

As can be appreciated from FIG. 12, the mounting of the container 10 to the walker 220 may encounter some congested regions. The mounting hardware described with reference to FIGS. 13–16 provides six degrees of freedom in a lateral and rotational direction, allowing the container 10 to be arranged, with respect to the walker 220, in a variety of orientations. To mount the container 10 to the walker 220, it is preferred that the first and second portions 246A, 246B of the cross member 246 be positioned at the proper telescoped position to mount to the first frame member 232. Then, the first and second clamp members 236, 238 are rotated to be aligned with the first frame member 232. The threaded bolts 260, 262 are then used to tighten the first clamp member 236 to the first frame member 232 and then the second clamp member 238 is similarly tightened to the first frame member 232. The screws 290 of the fifth and sixth clamp members 248, 250 are then loosened to allow the plate 110 to be rotationally and translationally positioned along the second portion 246B of the cross member 246. Once the plate 110 is in the preferred position, the screws 290 are then tightened to secure the plate 110 in the preferred position. At this point, the container 10 can then be slidably disposed on the plate 110 in the manner described above and is ready for use.

While the foregoing description of the container 10 and walker 220 discusses attaching the container 10 to the first frame member 232, it is understood by those skilled in the art that the fourth adapter 221 can be used to attach the container 10 to any portion of the walker 220 or other appliance, such as the cross member 228, without departing from the spirit and scope of the invention. Similarly, while the container 10 is shown mounted to the walker 220 on its interior, it is understood by those skilled in the art that the container 10 could be mounted on the exterior of the walker 220.

While the foregoing description of the container 10 and the first, second, third and fourth adapters 108, 150, 200 and 221, discloses the use of two different types of clamps for attaching the container 10 to an ambulatory appliance, it is understood by those skilled in the art that other types of clamps could be utilized to achieve the rotational and translational degrees of freedom presented by the clamps of the present invention, without departing from the spirit and scope of the invention. For instance, the clamps could be of the hose clamp type normally found in automobile engines for the purpose of connecting hoses to conduits.

It should now be appreciated that the practice of the present invention provides a carrying container 10 that is releasably attachable to various ambulatory appliances by means of a single common interface (i.e., the plate 110) so that the carrying container 10 may be easily and conveniently transferred from one ambulatory appliance to another. Furthermore, it should be appreciated that the common interface allows for easy yet safely secured connection of the container 10 to any of the ambulatory appliances.

While several preferred embodiments of the present invention have been disclosed and modifications thereof suggested, it will be recognized by those skilled in the art that still other changes could be made to the above-identified embodiments of the invention without departing from the broader concepts thereof. It should be understood, therefore, that the invention is not limited to particular embodiments disclosed, but is intended to cover the modifications which are within the scope and spirit of the invention, as defined by the appended claims.

I claim:

1. An article carrying container adapted for mounting upon a support apparatus, comprising:

a bottom wall having a first edge, a second edge, a third edge and a fourth edge;

a first wall extending generally perpendicularly from said first edge of said bottom wall;

a second wall extending generally perpendicularly from said second edge of said bottom wall;

a third wall extending generally perpendicularly from said third edge of said bottom wall, said third wall including a first retainer member positioned on an interior surface of said third wall;

a fourth wall extending generally perpendicularly from said fourth edge of said bottom wall, said bottom wall, said first wall, said second wall, said third wall and said fourth wall defining an interior portion of said container for receiving at least one article therein, said fourth wall including a mounting member for mounting said container upon said support apparatus; and a first compartment located in said interior portion of said container for receiving a first article therein, said first compartment comprising a fifth wall and a sixth wall, said fifth wall extending generally parallel to said third wall and including a first protrusion spaced from said first wall and positioned generally opposite said first retainer member of said third wall of said container, said sixth wall extending between said fifth wall and said fourth wall, a portion of said fifth wall, a portion of said first wall, a first portion of said third wall and a first portion of said bottom wall of said container defining a second compartment therebetween for receiving a second article therein, said first retainer member of said third wall of said container and said first protrusion of said fifth wall cooperating to secure said second article in said second compartment.

2. The article carrying container according to claim 1, wherein said first retainer member and said first protrusion are spaced apart from each other so that a correspondingly sized generally cylindrical first article can be frictionally held therebetween.

3. The article carrying container according to claim 1, wherein said third and fourth walls are each positioned at an obtuse angle of less than about 100° relative to said bottom wall.

4. The article carrying container according to claim 1, further including a lid extending generally parallel to and being spaced apart from said bottom wall, said lid being movable between an open position for permitting access to said interior portion of said container and a closed position for inhibiting access to said interior portion of said container.

5. The article carrying container according to claim 4, wherein said third wall further includes a lid retainer member on an exterior surface of said third wall for securing said lid in said open position.

6. The article carrying container according to claim 4, wherein one of said first and second walls includes a protrusion for engagement with said lid when said lid is in said closed position to secure said lid in said closed position.

7. The article carrying container according to claim 4, wherein said lid is generally planar for providing a working surface.

8. The article carrying container according to claim 1, wherein said portion of said first wall defining said first compartment is positioned at an obtuse angle of less than about 100° relative to said bottom wall.

9. The article carrying container according to claim 1, wherein at least a portion of said second wall is positioned at an obtuse angle of less than about 100° relative to said bottom wall.

10. The article carrying container according to claim 1, wherein said first retainer member comprises a rib extending generally perpendicular with respect to said bottom wall.

11. The article carrying container according to claim 1, wherein said first protrusion comprises a rib extending generally perpendicular with respect to said bottom wall.

12. The article carrying container according to claim 1, further comprising a third compartment located in said interior portion of said container for receiving a third article therein, said third compartment comprising a seventh wall and an eighth wall, said seventh wall extending generally parallel to said third wall of said container and including a second protrusion spaced from said second wall and positioned generally opposite a second retainer member on said third wall of said container, said eighth wall extending between said seventh wall and said fourth wall, said seventh wall of said second compartment, a portion of said second wall, a second portion of said third wall and a second portion of said bottom wall defining a fourth compartment therebetween for receiving a fourth article therein, said second retainer member of said third wall of said container and said second protrusion of said seventh wall of said second compartment cooperating to secure said fourth article in said fourth compartment.

13. The article carrying container according to claim 12, wherein said second retainer member and said second protrusion are spaced apart from each other by a predetermined distance and said fourth article is selected to have dimensions to be frictionally held between said second retainer member and said second protrusion.

14. The article carrying container according to claim 12, wherein said second retainer member of said third wall comprises a rib extending generally perpendicularly with respect to said bottom wall.

15. The article carrying container according to claim 12, wherein said second protrusion of said seventh wall of said second compartment comprises a rib extending generally perpendicularly with respect to said bottom wall.

16. An article carrying container adapted for mounting upon a support apparatus, comprising:

a bottom wall having a first edge, a second edge, a third edge and a fourth edge;

a first wall extending generally perpendicularly from said first edge of said bottom wall;

a second wall extending generally perpendicularly from said second edge of said bottom wall;

a third wall extending generally perpendicularly from said third edge of said bottom wall, said third wall comprising first, second, third and fourth ribs extending generally perpendicular to said bottom wall and being positioned on an interior surface of said third wall;

a fourth wall extending generally perpendicularly from said fourth edge of said bottom wall, wherein said bottom wall, said first wall, said second wall, said third wall and said fourth wall define an interior portion of said container for receiving at least one article therein, said fourth wall including a mounting member for mounting said container upon said support apparatus;

a lid extending generally parallel to and being spaced apart from said bottom wall, said lid being movable between an open position for permitting access to said interior portion of said container and a closed position for inhibiting access to said interior portion of said container;

a first compartment located in said interior portion of said container for receiving a first article therein, said first compartment comprising a fifth wall and a sixth wall, said fifth wall extending generally parallel to said third wall and including a first protrusion spaced from said first wall and positioned generally opposite said first rib on said third wall of said container, said sixth wall extending between said fifth wall and said fourth wall, said fifth wall, a portion of said first wall, a first portion of said third wall and a first portion of said bottom wall of said container defining a second compartment therebetween for receiving a second article therein, said first rib of said third wall of said container and said first protrusion of said fifth wall cooperating to secure said second article in said second compartment;

a third compartment located in said interior portion of said container for receiving a third article therein, said third compartment comprising a seventh wall and an eighth wall, said seventh wall extending generally parallel to said third wall of said container and including a second protrusion spaced from said second wall and being positioned generally opposite said second rib of said third wall of said container, said eighth wall extending between seventh wall and said fourth wall, said seventh wall, a portion of said second wall, a second portion of said third wall and a second portion of said bottom wall defining a fourth compartment therebetween for receiving a fourth article therein, said second rib of said third wall of said container and said second protrusion of said seventh wall cooperating to secure said fourth article in said fourth compartment; and a fifth compartment located in said interior portion of said container for receiving a fifth article therein, said fifth compartment being defined by said sixth wall, said eighth wall, a third portion of said third wall, a portion of said fourth wall and a third portion of said bottom wall, said third and fourth ribs of said third wall and said sixth and eighth wall cooperating to secure said fifth article in said fifth compartment.

17. An article carrying container according to claim 16, wherein said third and fourth walls are each positioned at an obtuse angle of less than about 100° relative to said bottom wall.

18. The article carrying container according to claim 16, wherein said mounting member comprises a pair of spaced apart ribs for increasing the rigidity of said fourth wall, each of said ribs having a slot for receiving an adapter for mounting said container upon said support apparatus.

19. The article carrying container according to claim 18, wherein said mounting member of said rear wall further comprises a retainer member for securing said adapter in each slot.

20. The article carrying container according to claim 18, wherein said adapter includes a plate having a pair of lateral edges for being received in said slots of said mounting member.

21. The article carrying container according to claim 20, wherein said support apparatus includes a frame member and wherein said adapter further comprises:
(i) a clamp member being clamped around a portion of said frame member;
(ii) a rod extending from said clamp member and having a generally bulbous-shaped distal end; and
(iii) a gimbal housing mounted on said plate and having an opening frictionally receiving said distal end.

22. The article carrying container according to claim 21, wherein said gimbal housing further includes an adjustment mechanism which adjusts a size of the opening to adjust the ease of freedom that the distal end can move with respect to the gimbal housing.

23. The article carrying container according to claim 20, wherein said support apparatus includes a frame member and wherein said adapter further comprises:
(i) a clamp member for being clamped around a portion of said frame member;
(ii) a rod extending from said clamp member and having a generally bulbous-shaped distal end;
(iii) a gimbal housing having an opening frictionally receiving said distal end;
(iv) a platform member secured to said gimbal housing, said platform member having a flange extending therefrom which includes an opening extending therethrough; and
(v) a guide tube slidably disposed within said flange opening and having a first end and a second end, said first end being secured to said plate, said guide tube being movable between a first position wherein said first end of said guide tube is positioned proximate said flange and a second position wherein said second end of said tube is positioned proximate said flange, said guide being releasably lockable in said second position.

24. The article carrying container according to claim 23, wherein said platform member includes a catch extending at least partially into said opening and said guide tube includes a keyway proximate the second end thereof, said guide tube being rotatable with respect to said platform when in the second position between a locked position wherein said catch is positioned within said keyway to longitudinally lock said guide tube in said second position and an unlocked position wherein said catch is spaced from said keyway to allow said guide tube to longitudinally move between said first and second positions.

25. The article carrying container according to claim 20, wherein said support apparatus comprises a crutch having a pair of spaced side supports and a handle extending therebetween, said handle being fastened to said side supports by at least one fastener, a pair of generally elongate members spaced apart from each other to accommodate the space between said side supports of said crutch, at least one of said elongate members having an opening aligned to receive said fastener therethrough, each of said elongate members being secured to said plate.

26. The article carrying container according to claim 20, wherein said support apparatus includes a frame member and wherein said adapter further comprises:
(a) first and second clamp members each for being clamped around a portion of said frame member;
(b) a cross member extending between said first and second clamp members and having a longitudinal axis, said first and second clamp members being secured to said cross member such that said first and second clamp members are rotatable with respect to said cross member about an axis which extends generally transverse to said longitudinal axis of said cross member, said plate being secured to said cross member such that said plate is rotatable with respect to said cross member about said longitudinal axis of said cross member.

27. The article carrying container according to claim 26, wherein said cross member is longitudinally expandable to adjust a distance between said first and second clamp members and said first and second clamp members being secured to said cross member such that said first and second clamp members are rotatable with respect to said cross member about said longitudinal axis of said cross member.

28. The article carrying container according to claim 16, wherein said mounting member comprises a pair of spaced apart ribs, each of said ribs having a slot for receiving an adapter for mounting said container on said support apparatus, said support apparatus further includes a frame member, said adapter comprising:

a clamp member for being clamped around a portion of said frame member;

a bar member being slidably and rotatably attached to said clamp member; and a plate attached to said bar member, said plate being adapted to be received in said slot of said mounting member.

29. An attachment device for releasably mounting a container to an ambulatory appliance having a frame member, said attachment device comprises:

(a) a plate for being received in a slot in said container;

(b) first and second clamp members each for being clamped around a portion of said frame member;

(c) a cross member extending between said first and second clamp members having a longitudinal axis, said first and second clamp members being secured to said cross member such that said first and second clamp members are rotatable with respect to said cross member about an axis which extends generally transverse to said longitudinal axis of said cross member, said plate being secured to said cross member such that said plate is rotatable with respect to said cross member about said longitudinal axis of said cross member, said cross member being longitudinally expandable to adjust a distance between said first and second clamp members and said first and second clamp members being secured to said cross member such that said first and second clamp members are rotatable with respect to said cross member about said longitudinal axis of said cross member.

* * * * *